US010276034B2

(12) United States Patent
Sundriyal et al.

(10) Patent No.: US 10,276,034 B2
(45) Date of Patent: Apr. 30, 2019

(54) SYSTEM AND METHOD FOR PLAYING BACK WIRELESS FIRE SYSTEM HISTORY EVENTS

(75) Inventors: Shubhankar Sundriyal, Bangalore (IN); Douglas Joseph Labrecque, Milford, CT (US); Monica Ravi, Bangalore (IN); Muthukumar Kandasamy, Bangalore (IN); RajeshBabu Nalukurthy, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 1316 days.

(21) Appl. No.: 13/187,410

(22) Filed: Jul. 20, 2011

(65) Prior Publication Data

US 2013/0024800 A1 Jan. 24, 2013

(51) Int. Cl.

*G06F 3/048* (2013.01)
*G08B 25/14* (2006.01)
*G08B 17/00* (2006.01)
*G08B 25/10* (2006.01)

(52) U.S. Cl.

CPC .............. *G08B 25/14* (2013.01); *G08B 17/00* (2013.01); *G08B 25/10* (2013.01)

(58) Field of Classification Search

CPC ......... G08B 29/04–29/16; G08B 17/00; G08B 25/14; G08B 25/10; H04L 12/2823–12/2829; H04N 21/42202
See application file for complete search history.

(56) References Cited

U.S. PATENT DOCUMENTS 4,581,605 A * 4/1986 Vogt .............................. 340/525
6,553,100 B1 * 4/2003 Chen et al. ..................... 379/37
7,576,770 B2 * 8/2009 Metzger et al. .............. 348/143
7,664,292 B2 * 2/2010 van den Bergen et al. .. 382/103
8,224,953 B2 * 7/2012 Childers et al. .............. 709/224
8,644,702 B1 * 2/2014 Kalajan ......................... 396/429
2002/0174223 A1 * 11/2002 Childers et al. .............. 709/224
2002/0174367 A1 * 11/2002 Kimmel ................. G08B 13/19 726/4
2003/0025599 A1 * 2/2003 Monroe ........... G08B 13/19602 340/531

(Continued)

*Primary Examiner* — Anil K Bhargava
(74) *Attorney, Agent, or Firm* — Brooks, Cameron & Huebsch, PLLC

(57) ABSTRACT

A method and apparatus are provided for displaying alarm and communication system events. The method includes the steps of providing a control panel coupled to a plurality of environmental sensors within a protected area, storing a sequence of events detected within the protected area by a communication system and at least some of the plurality of environmental sensors along with a time of the respective event in a history buffer of a memory of the control panel, depicting the plurality of environmental sensors and communication system on a display of the control panel and playing back the sequence of detected sensor and communication system events for a selected time period from the history buffer on the display where each of the plurality of depicted environmental sensors on the display is shown in an activated state for each instant of time of the selected time period that the history buffer indicates that the sensor was in the activated state and a deactivated state otherwise.

18 Claims, 3 Drawing Sheets

(56) References Cited

U.S. PATENT DOCUMENTS

| | | | | |
|---|---|---|---|---|
| 2003/0052770 | A1* | 3/2003 | Mansfield, Jr. | G08B 25/06 340/538.11 |
| 2003/0158635 | A1* | 8/2003 | Pillar | A62C 27/00 701/1 |
| 2003/0230415 | A1* | 12/2003 | Wilson | G08B 17/00 169/61 |
| 2005/0010649 | A1* | 1/2005 | Payne et al. | 709/217 |
| 2005/0222820 | A1* | 10/2005 | Chung | 702/188 |
| 2005/0270150 | A1* | 12/2005 | Freiling | B64D 45/0015 340/521 |
| 2006/0195716 | A1* | 8/2006 | Bittner | G08B 13/19656 714/6.11 |
| 2007/0103294 | A1* | 5/2007 | Bonecutter et al. | 340/539.18 |
| 2007/0146484 | A1* | 6/2007 | Horton et al. | 348/159 |
| 2007/0226616 | A1* | 9/2007 | Gagvani et al. | 715/700 |
| 2007/0245015 | A1 | 10/2007 | Raisoni et al. | |
| 2009/0009317 | A1* | 1/2009 | Weaver | G06Q 10/06 340/517 |
| 2009/0216345 | A1* | 8/2009 | Christfort | G05B 19/0428 700/21 |
| 2010/0160744 | A1* | 6/2010 | Ha et al. | 600/301 |
| 2010/0281312 | A1* | 11/2010 | Cohn | G08B 29/02 714/49 |
| 2011/0241877 | A1* | 10/2011 | Wedig | G08B 7/066 340/540 |
| 2012/0275084 | A1* | 11/2012 | Familiant | H04B 3/54 361/601 |
| 2013/0282280 | A1* | 10/2013 | Patterson | G08B 7/062 701/533 |

* cited by examiner

SYSTEM AND METHOD FOR PLAYING BACK WIRELESS FIRE SYSTEM HISTORY EVENTS

FIELD

The field relates to fire detection systems and more particularly to displays for fire detection systems.

BACKGROUND

Fire detection systems are generally known. Such systems are typically used in conjunction with a protected area (e.g., home, office, factory, etc.) to detect fires or other hazardous conditions (e.g., natural gas leaks, chemical discharge, etc.).

A fire detection system will typically include one or more environmental sensors (e.g., fire detection devices) coupled to a control panel. During normal use, the control panel monitors the environmental sensors for indications of hazardous conditions. Upon detecting an indication of such a condition, the control panel may activate a local alarm.

In addition to activating a local alarm, the control panel may also compose and send a fire alarm signal to a central monitoring station. The central monitoring station may, in turn, notify a local fire department or the police.

The environmental sensors used within such systems may be based upon any of a number of different types of technology. For example, some of the fire detectors may be based upon temperature rise. Alternatively, the fire detectors may be based upon technologies that detect products of combustion such as particulate or carbon monoxide.

While fire detection systems work well, they are often subject to false alarms and other communication problems. In order to trouble shoot the sources of such occurrences, it is often necessary to review a history of such occurrences saved within the control panel. Because of the difficulty in reviewing such files, a need exists for better methods of displaying records of sensor activation and of communication system failures.

DETAILED DESCRIPTION OF AN ILLUSTRATED EMBODIMENT

Figure 1:
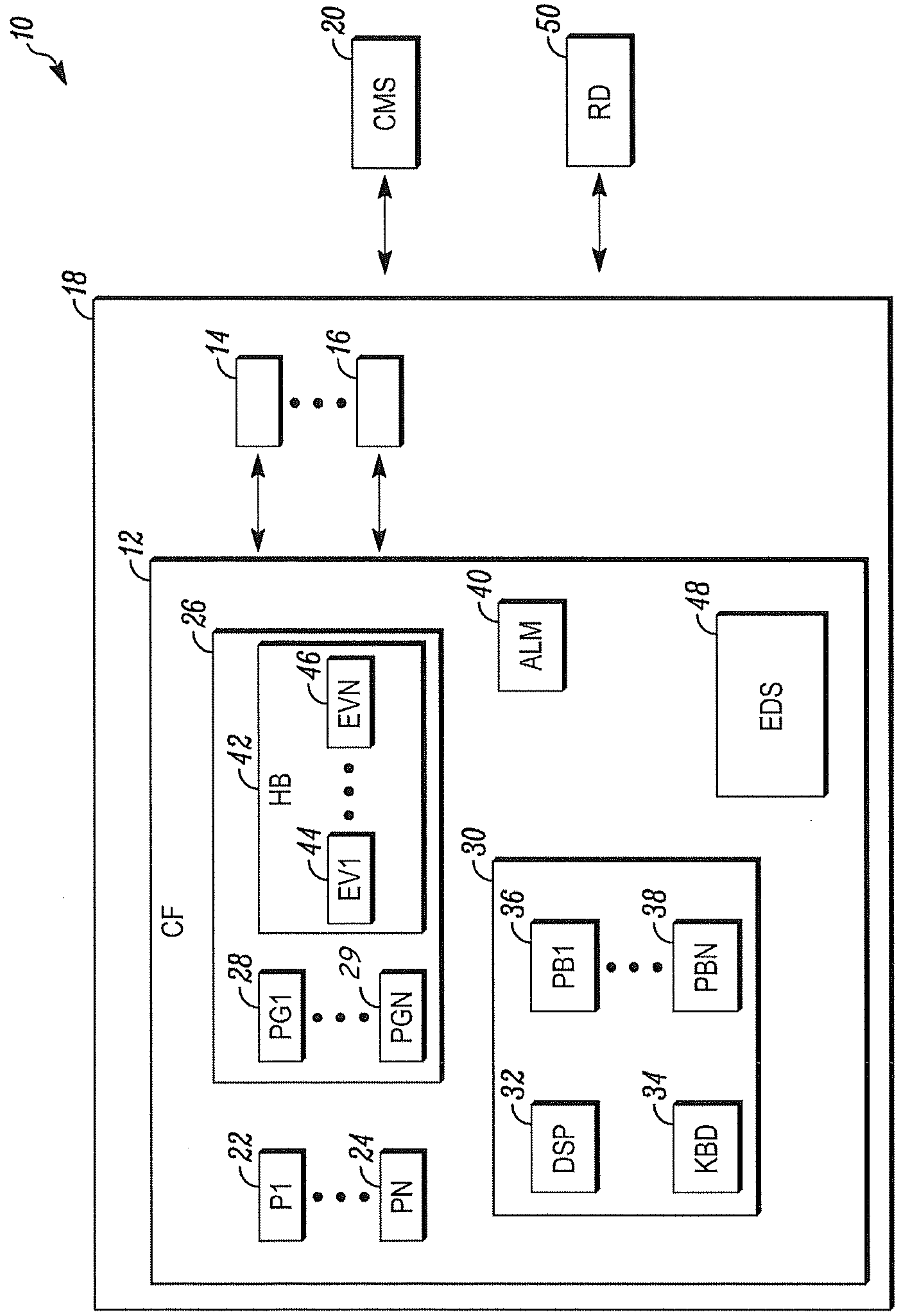
FIG. 1 is a block diagram of an alarm system in accordance with one illustrated embodiment.

FIG. 1 is a block diagram of a fire detection system 10 shown generally in accordance with an illustrated embodiment. Included within the system 10 may be a number of environmental sensors (e.g., thermal sensors, UV sensors, smoke detectors, carbon monoxide detectors, etc.) 14, 16 that detect fires or other hazardous conditions within a protected area 18.

The environmental sensors 14, 16 may be distributed throughout the protected area 18 with one or more of the sensors 14, 16 concentrated in areas of a higher relative risk of fire. The sensors 14, 16 may also be grouped into zones associated with specific risks or geographic spaces within the protected area 18.

While the sensors 14, 16 are constructed to detect specific events, they may also respond to transient local conditions that may represent the risk that the sensors 14, 16 were constructed to detect. The response to the transient conditions may result in a false alarm. False alarms are inherently dangerous because local personnel must respond to each detected event as if it were based upon the actual risk that the sensor 14, 16 was designed to detect.

The sensors 14, 16, in turn, are connected to a fire alarm control panel 12 that monitors the sensors 14, 16 for indications of hazardous conditions. The communication system between the sensors 14, 16 and alarm control panel 12 may be a packet based system where the control panel 12 (upon start up) detects the presence of any sensor 14, 16 connected to the panel 12. One difficulty with this type of communication system is that due to tampering or communication system interference, sensors 14, 16 may become disjoined from the panel 12 either because the panel 12 didn't discover the sensor 14, 16 (during start up) or because (of interference), the panel 12 lost contact with the sensor 14, 16.

Upon detecting a signal from one of the sensors 14, 16 indicating a hazardous condition, the control panel 12 may compose and send a fire alarm message to a central monitoring station 20. The alarm message may include at least an identifier of the control panel 12 or protected space 18 (e.g., a geographic address, system address, etc.) and an identifier of the sensor 14, 16 that detected the hazardous event. The central monitoring station 20 may respond by summoning a local fire department or the police.

Included within the control panel 12 may be one or more central processing units (processors) 22, 24. The processors 22, 24 may be programmed with (and operate under control of) one or more computer programs 28, 29 loaded from a non-transitory computer readable medium (memory) 26.

Associated with the control panel 18 may be a user interface panel 30. The user panel 30 may include a display 32, keyboard 34 and a number of function pushbuttons 36, 38 that are used by an authorized person to arm, disarm and otherwise control the system 10. While the user panel 30 shows a separate display 32, keyboard 34 and function keys 36, 38, it should be understood that some or all of the display 32, keyboard 34 and function keys 36, 38 may be integrated into one or more interactive touch panels including display areas and associated softkeys.

During normal use, a status processor 22, 24 within the control panel 12 may monitor the keyboard 34 for entry of commands and other information. For example, to arm the system 10, an authorized user may enter a personal identification number (PIN) through the keyboard 34 followed by activation of an arm pushbutton 36, 38. Upon detecting entry of the PIN and arm function key 36, 38, the status processor may compare the PIN with a list of authorized users within memory 26. If the PIN matches a previously saved PIN of an authorized user, then the status processor 22, 24 may cause the system 10 to enter an armed state.

Within the armed state, an alarm processor 22, 24 may monitor the sensors 14, 16 for signals indicating a hazardous condition. Upon detecting an indication of a hazardous condition from one of the sensors 14, 16, the alarm processor 22, 24 may enter an alarm state. In the alarm state, the alarm processor 22, 24 may activate a local audio or audio and visual alarm 40.

The alarm processor 22, 24 may send an identifier of the activated sensor 14, 16 to a communications processor 22, 24. The communication processor 22, 24 may compose and send an alarm message (as discussed above) to the central monitoring station 20.

The alarm processor 22, 24 also saves a record of each event into a respective file within a history buffer 42 located within memory 26. In fact, during set up of the system 10 and later use, the alarm processor 22, 24 may save a number of alarm events into a sequence of event files 44, 46. In this regard, each event file 44, 46 includes a time of the event and an identifier of the sensor 14, 16 that generated the event. It should be noted in this regard that a separate event file 44, 46 may be created (for example) whenever a sensor 14, 16 is activated and also when a sensor 14, 16 becomes deactivated. Each instance of arming and disarming the system 10 through the keyboard may also be saved within its own event file.

In the case where the sensors 14, 16 are wireless devices, the saved events may be related to the detection of environmental conditions and also events related to the communication system (wireless interface) that connects the sensor 14, 16 to the panel 12. Events may include loss of communication with a sensor 14 (e.g., the sensor becomes disjoined), 16 as well as reconnection with the sensor 14, 16.

Other event files 44, 46 may be created based upon the organization and reorganization of the communication system. Examples include the grouping of sensors 14, 16 into zones. Other examples of the organization of the system 10 may include some sensors 14, 16 exchanging messages with the panel 12 through other sensors 14, 16. Still other examples include, but are not limited to, joining of a disconnected/disjoint node to best suitable neighbor node.

In its most basic form, the system 10 may generate and save an event file 44, 46 whenever an event message is received. Another event file may be created for an acknowledgement message is returned to the device that detected the event. Other event files 44, 46 may be created for supervisory events and trouble conditions.

The history buffer 42 may receive and contain event files 44, 46 from a number of different processes (and processors) 22, 24 of the system 10. For example, a system processor 22, 24 of the system 10 may save routine event messages that indicate system status and operational states of the system. A non-exhaustive list of example events saved in the history buffer may include master wireless controller (gateway) radio micro status messages, fire device found messages, fire device lost messages, mode change messages, parent link failed messages, child link failed messages, device change state messages, pull station short circuit messages, pull station open circuit messages, pull station reset during fire messages, fire detector fault messages, slot re-alignment messages, fire messages, tamper fault messages, slot re-allocation messages, partial link recovery messages, low battery warning messages, battery level messages, invalid MAC address messages, slot allocation fail messages, communication channel terminated messages, communication channel restored messages, too many transmission errors at device messages, duplicate serial number messages, configuration error messages, too many devices found messages and device serial number changed messages.

In general, the history buffer 42 provides the very important function of providing a record of system activity. This record may be important for purposes of providing an audit trail for such things as auditing for the periodic testing of the system 10 as well as for use by technicians in trouble shooting malfunctions. For example, the environmental sensors 14, 16 may become damaged, disconnected or simply fail to operate after some period of time leaving the protected area 18 (and occupants) vulnerable to damage and death in the event of a conflagration.

The history buffer 42 can also be used to evaluate the overall condition of the system 10. In this regard, the number (or absence) of false alarms gives indication of the availability, use and functionality of the system 10. The history buffer 42, via event files 44, 46, also provides information about how the network evolves over time based upon the organization and reorganization of the system 10.

In addition, the history buffer 42 can serve the important function of allowing arson investigators to conduct forensic studies of fire progression by providing a record of when each sensor 14, 16 became active. This can be very important in identifying a source of a fire and how the fire developed.

In the past, history buffers 42 have been difficult to use because the information was typically difficult to access and also because the retrieved information was presented simply as a column of times and alphanumeric identifiers. Without a cross-reference, it was difficult to relate the alphanumeric identifiers with sensors 14, 16.

In order to alleviate the difficulties associated with use of retrieval of information from the history buffer 42, the system 10 includes an event display system 48 that operates from within the control panel 12 or from within a remote device 50. When operating from within the control panel 12, the display system 42 may display events on the user interface display 32 using one or more processors 22, 24 to retrieve and display event information. When operating from within the remote device 50, one or more file processors 22, 24 within the remote device 50 and/or control panel 12 may retrieve files 44, 46 from the history buffer 42 and transfer those files 44, 46 to the remote device 50. Corresponding processors 22, 24 may operate to display those events on a corresponding display of the remote device 50.

Figure 2:
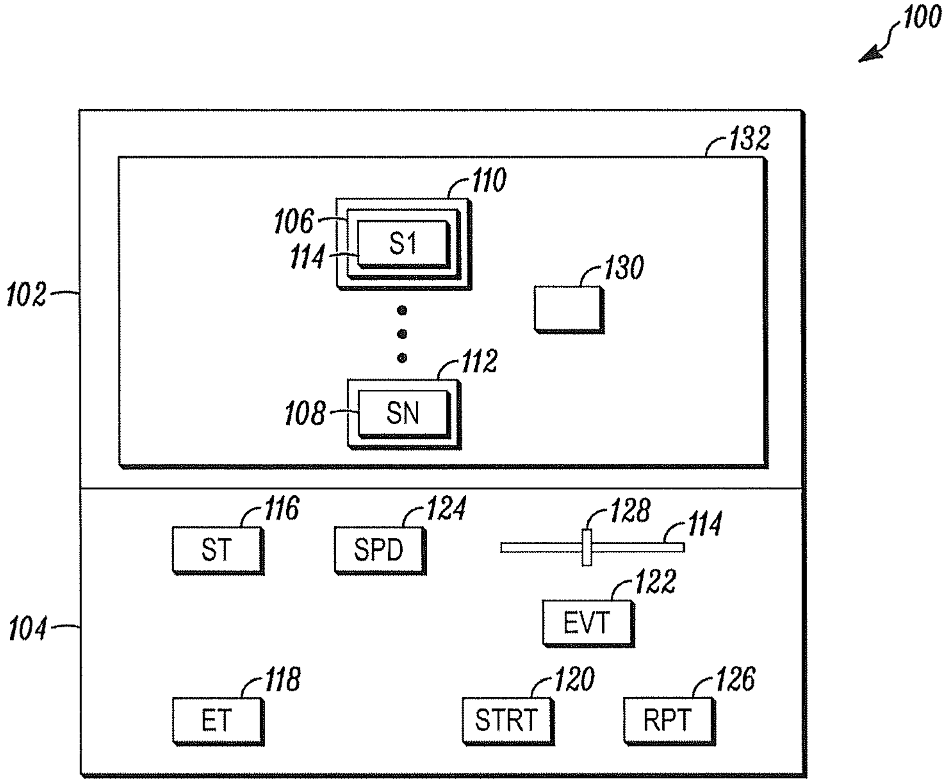
FIG. 2 depicts a user interface that may be used with the system of FIG. 1.

FIG. 2 shows a user interface 100 that may be presented by the display system 48. In this regard, the user interface 100 may share the same hardware as the user interface 30 where the interface 100 is accessed by activation of one of the function buttons 36, 38. The user interface 100 may be accessed through the remote device 50 in a similar manner.

In this regard, the user interface 100 may include a display 102 and control 104. As with the interface 30, the image display 102 and control 104 may be implemented as an interactive screen.

Shown depicted on the display 102 is a respective icon 106, 108 of each of the environmental sensors 14, 16. Associated with each of the icons 106, 108 is a respective alphanumeric identifier 114 of the sensor 14, 16.

Also associated with each of the icons 106, 108 may be indicia 110, 112 of activation of the respective sensors 14, 16. Under one embodiment, the indicia of activation 110, 112 is highlighting. Under another embodiment, the indicia 110, 112 is a color of the icon 106, 108.

The icons 106, 108 and respective indicia 110, 112 may be used together to indicate a state of the associated sensor 14, 16. When the associated sensor 14, 16 is not activated, the icon 106, 108 would appear without the indicia 110, 112. However, whenever the associated sensor 14, 16 becomes activated, the respective indicia 110, 112 is shown along with the icon 106, 108 to give a clear indication of the state of the underlying sensor 14, 16.

The interface 100 is used to display sequences of events on the display 102. To use the display system 48, a user may first enter a starting time of the sequence through a first interactive window 116 and activate a start button 120. In response, a records processor 22, 24 of the event processor 48 may activate an event time base using the entered starting time as the initial time value. The advancing time within the time base may be displayed in an event time window 122. The event display system 48 may also begin displaying events defined by the content of files 44, 46 on the interface 100 that correspond to the then current time within the event time base (and shown in window 122).

In this regard, a comparison processor 22, 24 within the event display system 48 may compare the then current time within the event time base with the event time saved within each of the records 44, 46. Whenever a match is found, the identification of a sensor 14, 16 within the matching file 44, 46 is retrieved and the icon 106, 108 that corresponds to that sensor 14, 16 is changed to the state that corresponds to the event saved within the event file 44, 46 (i.e., the indicia 110, 112 is changed from a deactivated to an activated state or from an activated to a deactivated state).

Under one mode of operation, the event time base may increment at the same rate as a local clock of the system 10. Under another mode, a speed multiplier may be selected through a speed multiplier window 124. For example, if a speed multiplier of 2 is entered into the window 124 then the event time base increments at a rate of 2 seconds for each 1 second increment of the system clock. This allows a greater number of events to be viewed in a shorter period of time.

Under another mode of operation, the user may enter a starting time in the first window 116 and an ending time of the event sequence into a second window 118. Upon activating the start button 120, the events between the starting and ending time are depicted in the display 102 at a speed determined by the speed multiplier entered through the speed window 124.

At the end of the sequence, the user may wish to view the sequence a second time. In this case, the user may activate a repeat button 126 to proceed through the event sequence a second time.

Alternatively, the interface 100 may be provided with a time line or bar 114 to display events within a selected time period. In this case, the user may enter a start and end times using windows 116, 118 as discussed above. However, in this case, the user may move a tab 128 on the time bar to select a relative time and/or any time instant between the start and end times without activating the start button 120 of the event time base. In this case, the user may manually move the tab 128 to the right or left to advance forwards or backwards in time between the start and end time points and to display the activated and deactivated status of each of the sensors 14, 16.

In another embodiment, an icon processor 22, 24 within the event processor 48 allows a user to move the icons 106, 108 to any arbitrary position on the display 102. This allows a user to group the icons 106, 108 of predefined alarm zones into separate geographic locations of the display in order to more easily correlate activations of different sensors 14, 16 within the same alarm zone.

In still another embodiment, a context processor 22, 24 may superimpose the icons 106, 108 over one or more geographic markers 130. The icon processor 22, 24 may be used to move the icons 106, 108 and geographic markers 130 to any convenient location on the display 102. The use of the geographic markers 130 on the display allows the user to associate the markers 130 with the icons 106, 108 in such as way as to associate geographic reference points with each of the icons 106, 108.

In still another embodiment, the context processor 22, 25 may superimpose the icons 106, 108 over a depiction (e.g., a map) 132 of the protected area 18. This may be used to further allow a user to correlate the sensors 14, 16 with an area of use.

Figure 3:
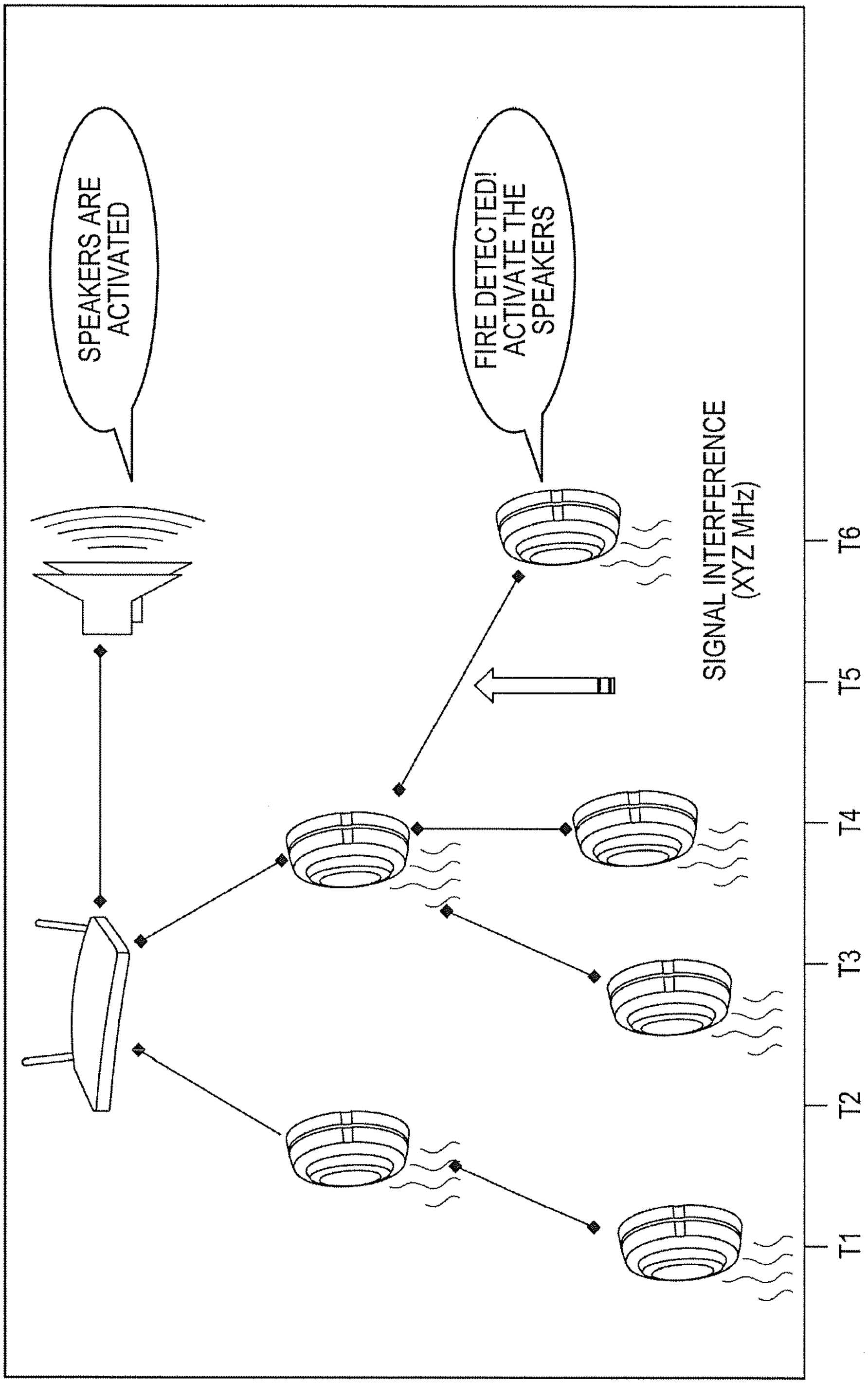
FIG. 3 depicts a sequence of events detected by the system of FIG. 1.

In still another embodiment, the display may be structured as shown in the time line sequence of FIG. 3. In this case, the display of FIG. 3 shows a time line along the bottom and icons of sensors 14, 16 and communication system devices as they become activated. In this example, the sensor 14, 16 on the lower left is shown to be activated at time T1.

Since T1 is the time of the first event, the sensor 14, 16 is the only icon shown at time T1. At time T2, a second sensor 14, becomes activated and/or transmits a signal to the panel 12. At time T3, a third sensor becomes activated. At time T4, a fourth and fifth sensors 14, 16 becomes active while the fifth sensor transmits signals from the third and fourth sensors to the panel 12.

At time T5, a signal interference event is detected and displayed. At time T6, the activation of a set of speakers is shown.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:

providing a control panel coupled to a plurality of environmental sensors via a communication system, wherein each of the plurality of environmental sensors is located within a protected area, and wherein each of the plurality of environmental sensors detects fires;

storing a sequence of events and a respective time of each of the sequence of events in a history buffer of a memory of the control panel, wherein each of the sequence of events is detected within the protected area by at least some of the plurality of environmental sensors, and wherein the sequence of events includes alarm events, arm and disarm events, supervisory events, trouble conditions, loss of communication with a first of the plurality of environmental sensors, and reconnection with the first of the plurality of environmental sensors;

depicting the plurality of environmental sensors as a plurality of icons on a display of the control panel;

receiving input from a user to move a first of the plurality of icons to a new location on the display;

depicting a time line and a tab on the time line, wherein the tab moves along the time line as the sequence of events is played back, and wherein a position of the tab on the time line indicates an instant of time within a time period;

receiving user input activating a start button to begin advancing time such that the tab moves along the time line at a predetermined rate;

comparing a time corresponding to the position of the tab on the time line with the history buffer to determine whether any of the respective times of the sequence of events matches the instant of time corresponding to the position of the tab on the time line; and displaying one of the plurality of icons depicted on the display in an activated state when the instant of time corresponding to the position of the tab on the time line matches one of the respective times of the sequence of events and in a deactivated state otherwise.

2. The method as in claim 1 wherein the playing back includes downloading the history buffer to a remote location and playing back the sequence of events from the remote location.

3. The method as in claim 1 wherein the control panel depicts the respective time of each of the sequence of events while playing back the sequence of events on the display.

4. The method as in claim 3 further comprising the user entering a starting time and an ending time for the time period.

5. The method as in claim 4 further comprising the user activating a repeat button to repeat the playing back the sequence of events.

6. The method as in claim 1 further comprising superimposing the plurality of icons on a geographical display of the protected area.

7. The method as in claim 1 further comprising highlighting each of the plurality of icons when shown in the activated state.

8. The method as in claim 1 further comprising changing a color of each of the plurality of icons when shown in the activated state.

9. The method as in claim 1 further comprising playing back the sequence of events at an accelerated time rate.

10. A system comprising:

a control panel coupled to a plurality of environmental sensors via a communication system, wherein each of the plurality of environmental sensors is located within a protected area, and wherein each of the plurality of environmental sensors detects fires;

a memory of the control panel that stores a sequence of events and a respective time of each of the sequence of events in a history buffer of the memory, wherein each of the sequence of events is detected within the protected area by at least some of the plurality of environmental sensors, and wherein the sequence of events includes alarm events, arm and disarm events, supervisory events, trouble conditions, loss of communication with a first of the plurality of environmental sensors, and reconnection with the first of the plurality of environmental sensors; and an event processor that depicts, on a display, a plurality of icons corresponding to the plurality of environmental sensors, a time line, and a tab on the time line, wherein the event processor receives, from a user, an input to move a first of the plurality of icons to a new location on the display, wherein the tab moves along the time line as the sequence of events is played back, wherein a position of the tab on the time line indicates an instant of time within a time period, wherein the event processor receives user input activating a start button to begin advancing time such that the tab moves along the time line at a predetermined rate, wherein the events processor compares a time corresponding to the position of the tab on the time line with the history buffer to determine whether any of the respective times of the sequence of events matches the instant of time corresponding to the position of the tab on the time line, and wherein the events processor displays one of the plurality of icons depicted on the display in an activated state when the instant of time corresponding to the position of the tab on the time line matches one of the respective times of the sequence of events and in a deactivated state otherwise.

11. The system as in claim 10 wherein the event processor downloads the history buffer to a remote location and plays back the sequence of events at the remote location.

12. The system as in claim 10 wherein the control panel depicts the respective time of each of the sequence of events while the event processor plays back the sequence of events.

13. The system in claim 12 further comprising an interactive portion of the display that allows the user to enter a starting time and an ending time for the time period.

14. The system as in claim 13 further comprising a repeat button activated by the user to repeat the sequence of events.

15. The system as in claim 10 wherein the display displays the plurality of icons superimposed on a geographical display of the protected area.

16. The system as in claim 10 wherein the activated state of each of the plurality of icons includes highlighting a respective one of the plurality of icons.

17. The system as in claim 10 wherein the activated state of each of the plurality of icons includes changing a color of a respective one of the plurality of icons.

18. A system comprising:

a control panel coupled to a plurality of environmental sensors via a communication system, wherein each of the plurality of environmental sensors is located within a protected area, and wherein each of the plurality of environmental sensors detects fires;

a memory of the control panel that stores a sequence of events and a respective time of each of the sequence of events in a history buffer of the memory, wherein each of the sequence of events is detected within the protected area by at least some of the plurality of environmental sensors, and wherein the sequence of events includes alarm events, arm and disarm events, supervisory events, trouble conditions, loss of communication with a first of the plurality of environmental sensors, and reconnection with the first of the plurality of environmental sensors;

a file processor that retrieves the sequence of events; and an event processor that depicts a plurality of icons corresponding to the plurality of environmental sensors, a time line, and a tab on the time line on a display, wherein the event processor receives, from a user, an input to move a first of the plurality of icons to a new location on the display, wherein the tab moves along the time line as the sequence of events is played back, wherein a position of the tab on the time line indicates an instant of time within a time period, wherein the event processor receives user input activating a start button to begin advancing time such that the tab moves along the time line at a predetermined rate, wherein the events processor compares a time corresponding to the position of the tab on the time line with the history buffer to determine whether any of the respective times of the sequence of events matches the instant of time corresponding to the position of the tab on the time line, and wherein the events processor displays one of the plurality of icons depicted on the display in an activated state when the instant of time corresponding to the position of the tab on the time line matches one of the respective times of the sequence of events.

* * * * *